A. D. MARSTON,
FISH STOP.
APPLICATION FILED JULY 5, 1917.

1,263,691.

Patented Apr. 23, 1918.
2 SHEETS—SHEET 1.

WITNESSES

INVENTOR
Albert D. Marston,
BY
ATTORNEY

A. D. MARSTON.
FISH STOP.
APPLICATION FILED JULY 5, 1917.
1,263,691.
Patented Apr. 23, 1918.
2 SHEETS—SHEET 2.
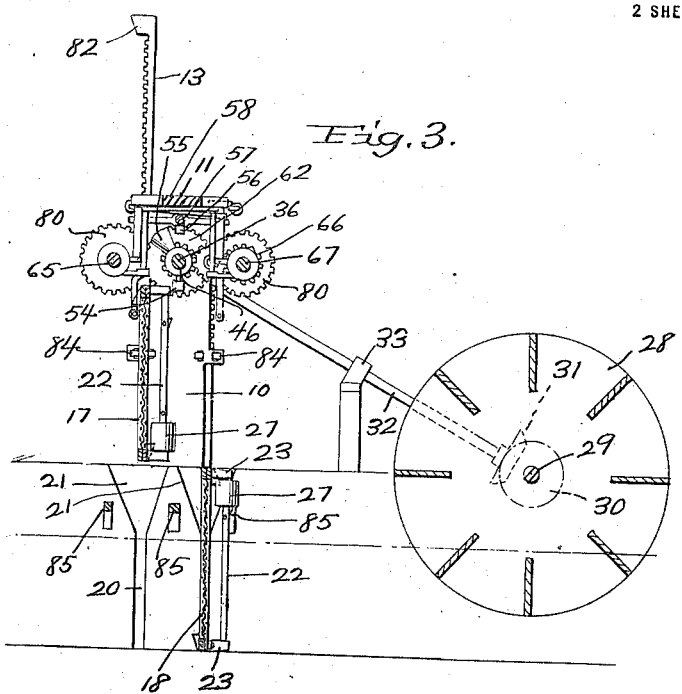
Fig. 3.
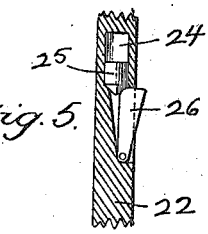
Fig. 5.
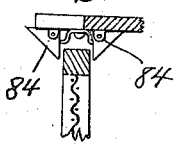
Fig. 4.
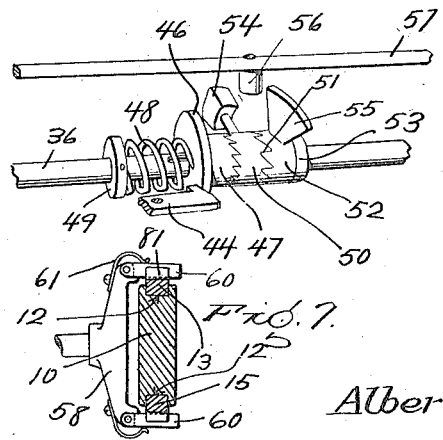
Fig. 6.
Fig. 7.
WITNESSES
G. Hennery
Wm Zearman
INVENTOR
Albert D. Marston,
BY Richard Bowen,
ATTORNEY

UNITED STATES PATENT OFFICE.

ALBERT D. MARSTON, OF WHITING, KANSAS.

FISH-STOP.

1,263,691. Specification of Letters Patent. Patented Apr. 23, 1918.

Application filed July 5, 1917. Serial No. 178,790.

*To all whom it may concern:*

Be it known that I, ALBERT D. MARSTON, a citizen of the United States, residing at Whiting, in the county of Jackson and State of Kansas, have invented certain new and useful Improvements in Fish-Stops, of which the following is a specification.

This invention has relation to fish stops, and has for an object to provide a device to be interposed in a stream, and embodying means operable by the flow of the stream to clear the stream of debris and at the same time to provide a barrier whereby to prevent fish from swimming up stream.

Another object of the invention is to provide a fish stop of the character above noted embodying a plurality of barriers against the passage of fish through the stream, and means for alternately raising and lowering the barriers to permit passage of debris down the stream.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Fig. 3, is a view in vertical section taken on the line 3—3 of Fig. 1.

Fig. 4, is a detail view in perspective illustrating a portion of the mechanism.

Fig. 5, is a detail view of an automatically operating latch.

Fig. 6, is a detail view of another latch mechanism, and

Fig. 7, is a detail view of the pawl mechanism.

Figure 1:
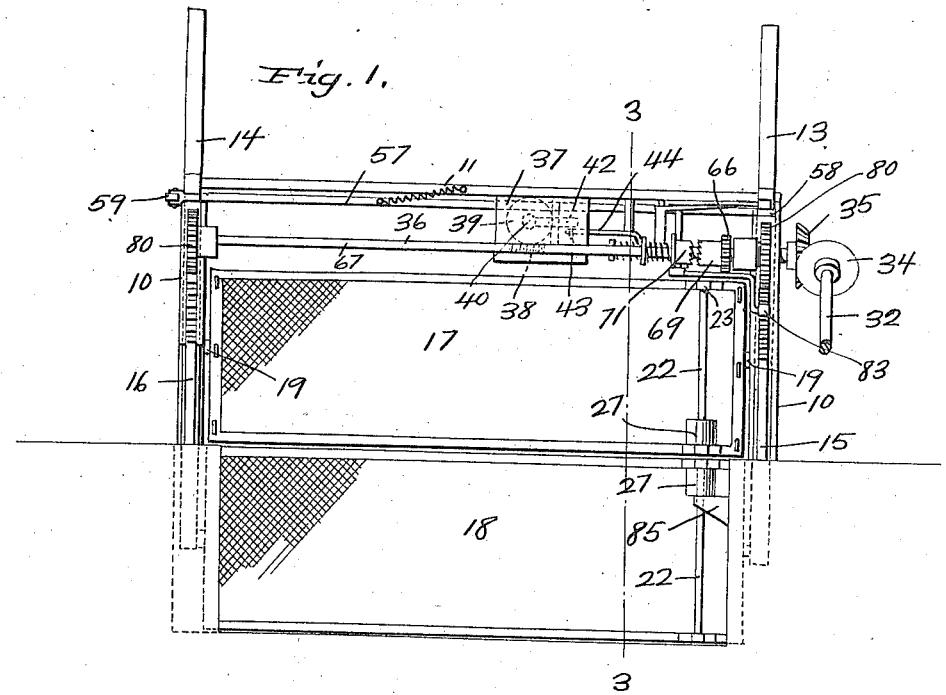
Figure 1, is a view in front elevation of a fish stop constructed in accordance with my invention illustrated in position in the bed of a stream.
Figure 2:
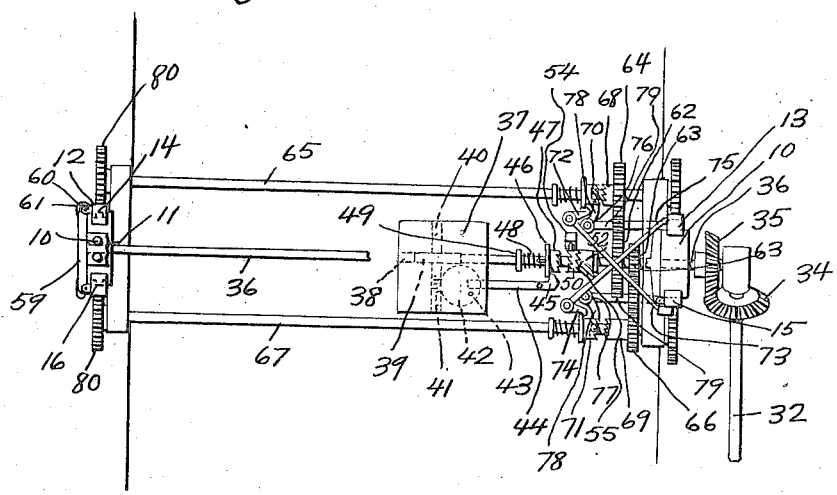
Fig. 2, is a view of the device in plan.

With reference to the drawings 10 indicates a pair of uprights, one being located at each side of the stream, connected at their upper ends by means of a transversely extending cross bar 11. Opposite edges of the uprights 10 are formed with vertical grooves 12 in which rack bars 13, 14, 15 and 16 are guided for vertical movement. The rack bars 13 and 14 support a screen 17 at their lower ends while a similar screen 18 is supported by the bars 15 and 16. The screen in each instance is in the nature of a rectangular frame having trunnions 19 at opposite ends to be received in recesses in the rack bars for supporting the same whereby to permit rotation of the screens for a purpose which will be presently noted. The screens are designed for vertical movement in opposite directions and when in place across the stream the edges of the screens are held in grooves 20 formed in foundation walls, a plate or other means provided at opposite sides of the stream, the grooves being preferably flared at their upper ends as indicated at 21. Each screen carries a vertical bar 22 supported at its ends in brackets 23 which extend from the sides of the screens at the upper and lower edges thereof. Each bar is formed with a longitudinally extending recess 24 at each end as indicated more clearly in Fig. 5 wherein to receive a conical weight 25. A pawl 26 is mounted in the recess and when the screens are disposed in certain positions those pawls 26 which depend are inclosed entirely within the recesses of the rods, however, when the screens are reversed so as to reverse the position of the pawls, the weighted members are designed to engage the inner edge of the pawls so as to urge them outward to extend beyond the outer surface of the rod. An arrangement of this kind is provided at each end of each rod in a manner to dispose the pawls 26 in opposite directions. Each rod 22 is furthermore provided with a sliding weight 27 apertured to receive the rod and adapted to slide along the rod from one end to the other thereof as the screens are reversed.

A water wheel 28 is mounted on a shaft 29 which extends transversely of the stream so as to dispose the paddles of the water wheel beneath the surface of the water so that the flow of the stream may rotate the paddle wheel continuously. A bevel gear 30 is fixedly mounted upon the shaft 29 for engagement with a similar gear 31 which is mounted at the lower end of a shaft 32 which is journaled in the bearing 33 and extends upward toward the right hand end of the framework of the device or adjacent the upper end of the right hand standard 10 as indicated. The upper end of said shaft 32 carries a bevel gear 34 which meshes with the bevel gear 35 mounted on the shaft 36 and extending transversely of the machine or across the stream and journaled at its ends in the upper ends of the standards 10. The shaft also extends through a casing 37 and is provided interiorly thereof with a worm 38 which meshes with a worm wheel 39 mounted on a shaft 40 which is formed with a worm 41 adapted to mesh with a worm wheel 42. A pin 43 is eccentrically mounted upon said worm wheel 42 for intermittent engagement with the end of a pawl 44 normally engaging by means of a hooked terminal 45 an annular enlargement 46 of a clutch member 47 mounted for longitudinal sliding movement upon the shaft 36, the clutch member being urged toward the right by means of a coil spring 48 which bears against said clutch member and against the collar 49 rigidly mounted on the shaft. The clutch member 47 is designed for engagement with a sliding collar 50 having a ratchet face on one end for engagement with the face of the ratchet member 47 and having a second ratchet face on its opposite end indicated at 51 for coaction with a collar 52 loosely mounted on the shaft 36 but adapted to bear against a rigidly mounted collar 53. The collar 50 is loosely mounted on the shaft also and is provided with a radially extended weighted arm 54. The collar 52 is provided with a cam member in the nature of a vane 55 extended radially and is twisted so as to lie in a spiral plane relative to the center of the shaft. The cam member 55 is intended for engagement with a roller 56 mounted on a rod 57 which extends parallel to the shaft 36 and thereabove and is provided at its right and left hand ends with heads 58 and 59 respectively, each head comprising a transversely extending member having pawls 60 pivoted to its terminals and springs 61 to dispose said pawls at opposite sides of the standards 10 for engagement by lugs on the rack bars 13, 14, 15 and 16 in a manner which will be presently described. Gears 62 and 63 are rigidly mounted upon the shaft 36, the gear 62 meshing with a gear 64 loosely mounted upon a shaft 65 disposed parallel to the shaft 36 and located at one side thereof, the gear 63 meshing with a gear 65 loosely mounted on a shaft 67 parallel to the shaft 36 and mounted at the opposite side thereof, said shafts 65 and 67 being journaled at their ends in bearings secured to the standard 10.

Gears 64 and 66 carry clutch members 68 and 69 respectively for engagement with clutch members 70 and 71 splined upon the shafts 65 and 67 respectively, the clutch members 70 and 71 being urged toward engagement with their mating clutch members by means of coil springs which encircle the shaft as indicated. The clutch member 70 is normally retained out of such engagement by means of a latch member 72 pivotally mounted and carrying an arm 73 which extends transversely of the machine at an angle thereto and has its terminal disposed in a position to be engaged by a lug on the rack bar 15. A similar latch member 74 is pivotally mounted adjacent the clutch member 71 to engage the same to normally retain it out of engagement with the coacting clutch member and is similarly provided with an arm 75 which extends transversely of the machine in cross relation to the arm 73 with its terminal disposed adjacent the rack bar 13 to be engaged by a lug formed therein. The clutch members 70 and 71 are reset after release by means of bell cranks 76 and 77, each having an arm 78 for engaging the clutch members 70 and 71 and arms 79 having their terminals located adjacent the rack bars 13 and 15 to be engaged by the lugs thereon. The shafts 65 and 67 are provided on their terminals with gears 80 which mesh with the rack bars 13, 14, 15 and 16 to raise or lower the same in a manner which will be presently noted.

In operation, the force of the current acts to rotate the water wheel 28, the motion of which is constantly transmitted through the medium of the bevel gears 30 and 31 to the shaft 32 which transmits its motion to the shaft 36. Motion of the shaft 36 is communicated by means of the gearing within the casing 37 to the worm wheel 42 of said gearing. The gearing as described above is of such a nature as to cause the worm wheel 42 to rotate very slowly relative to the rate of movement of the shaft 36. The pawl 44 is then engaged by the pin 43 on said worm wheel 42 whereupon the pawl is moved sufficiently to disengage the clutch member 47 whereby said member is moved into engagement with the collar 50 so that said collar 50 is rotated by continued rotation of the shaft 36. The collar 50 being in engagement with the collar 52, said collar 52 is also rotated until its cam member 55 engages the roller 56 of the rod 57 thereby shifting said rod 57 toward the left in a longitudinal direction until the pawls 60 which are mounted on the heads 58 and 59 of said rod 57 are disengaged from lugs 81 formed on the rack bars 13, 14, 15 and 16. It will be apparent that as only two of these rack bars, that is number 13 or 14, or 15 or 16 will be in raised position at one time, those rack bars which are held in raised position by engagement therewith of the pawls 60 will be released whereby the screen carried by said rack bars will be sent into the stream by the force of gravity. Continued rotation of the shaft 36 will rotate the collar 50 sufficiently to bring the weighted arm 54 thereof beyond a vertical plane passing through the shaft 36 whereby the weight 54 in descending will act to rotate the collar 50, which, owing to the provision of its ratchet face 51 which engages with a similar face of the collar 52, said collar 50 will be urged away from the collar 52, and the clutch member 47 will be moved backward against the tension of the spring 48 until the collar 46 will be reëngaged by the pawl 44, and the cam member will be at the same time moved sufficiently to permit the rod 57 to return to its original position. The upper end of each of the rack bars 13 and 15 are formed with outstanding inclined faces or lugs 82 as shown in Fig. 3 whereby the lug 82 of the rack bar which descended engages the terminal of the arm 75 whereby to disengage the latch member 74 from the clutch member 71 which is mounted on the shaft 67 so as to permit said clutch member to be urged into engagement with its coacting clutch member 69 to lock the shaft 67 to the gear 66. Rotation of the shaft 36 will thus be imparted to the shaft 67 whereby the same may operate by means of its gears 80 to raise the rack bars 15 and 16 which will lift the screens or barrier 18 out of the stream. This movement of the rack bars 15 and 16 and the screen will continue until a lug 83 on the rack bar 15 will engage the adjacent arm of the bell crank 77 whereby the clutch member 71 will be moved back until reengaged by the latch member 74 and the shafts 67 and gear 66 will be again disengaged and further movement of the rack bars 15 and 16 ceases.

To return to the screen 18, as the same is lifted from the stream the weight 27 carried thereby will be in a position adjacent the upper horizontal edge of said screen whereby the same is over balanced and after the screen has been lifted from the groove 20 in the side walls of the screen, said screen will be rotated by gravity thereby disposing the face which was formerly directed upstream, toward down-stream. The rotative movements imparted by the weights 27 will be sufficient to rotate the screen and cause the same to be engaged at one of its vertical edges within a pair of latch members 84 mounted on one of the uprights 10 thereby holding the screen in a vertical position.

To return to the screen 17, as the same was being moved downward in the manner described above, the weights 27 thereof, which was in a lowermost position against the bottom horizontal edge of the screen will be contacted by one of a number of outstanding arms 85 projecting from one side wall of the stream thereby disposing, during further downward movement of the screen 17, the weights 27 adjacent the upper horizontal edge of said screen at which point it will be held by one of the latches 26 mounted in the rod 22 upon which the weight is guided. The screen 18 now being in an elevated position, and the screen 17 in a position in the stream it will be apparent that the operation described above will be repeated with reference to the screen 18 when the worm wheel 42 completes another revolution to engage the pawl 4.

Thus it will be seen that the screen which is disposed in the stream will form a barrier against the passage of fish up-stream, and will at the same time momentarily prevent the passage of debris down stream, said debris collecting on the screen. However, when the screen is elevated and reversed so as to dispose the surface thereof bearing the debris in a direction downstream, the waste will be washed by the flow of water from the screen.

Having thus described my invention what I claim as new and desire to secure by Letters Patent is:—

1. A fish stop including a pair of barriers for submersion in a stream, one at a time, means retaining the submerged barrier in position, means operable by the current of the stream for intermittently releasing said retaining means and for elevating the submerged barrier, and means operating automatically for reversing the position of the said barrier relative to the direction of flow of the stream during elevation.

2. A fish stop including a pair of barriers for submersion in a stream, one at a time, retaining means to hold the elevated barrier in position, a power means operable continuously by the current of the stream, a reduction gear operable by said power means, means operable intermittently by said reduction gear for releasing the submerged screen to permit it to descend by gravity, means operable by the descent of said barrier for elevating the submerged barrier, and means operable automatically during movement of said lowered barrier for reversing the position thereof relative to the direction of flow of the stream.

3. A fish stop including a pair of barriers for submersion in a stream, one at a time, means retaining the elevated barrier in position, a power means operable continuously by the flow of the stream, a reduction gear operable continuously by said power means, means for elevating the barriers, means operable intermittently by the reduction gear for releasing said retaining means to permit descent of the unsubmerged barrier, means operable by descent of said barrier for initiating operation of the other barrier raising means, means operable by upward movement of said last mentioned barrier when at a maximum height for stopping operation of said barrier raising means, and means operable automatically during upward movement of said barrier for reversing the position thereof relative to the direction of flow of the stream.

4. A fish stop including a pair of barriers for submersion in a stream, one at a time, retaining means for holding the unsubmerged barrier in position, a power means operable continuously by the flow of the stream, a reduction gear operable continuously by the power means, a pair of normally inoperative means for elevating the barriers, means operable by the reduction gearing intermittently for releasing the unsubmerged barrier, means operable by descent of said barrier for initiating operation of the elevating means of the submerged barrier whereby said barrier may be elevated, means operable by said submerged barrier when elevated to its uppermost position to discontinue operation of its elevating means, means operable automatically to permit reëngagement of the retaining means, an automatically operable means for reversing the position of the unsubmerged barrier relative to the direction of flow of the stream.

5. A fish stop including a pair of vertically movable barriers for submersion in a stream one at a time, means for retaining the elevated barrier in position, a power shaft, means operable by the flow of the stream for operating said power shaft continuously, a reduction gear operable continuously by said power shaft, a clutch on said shaft, means operable by operation of the reduction gearing for throwing said clutch into engagement, means operable when said clutch is thrown into engagement and by the power shaft for releasing the retaining means to permit the elevated barrier to descend, a second shaft, a clutch on said shaft, gearing connecting the power shaft with said second shaft, means operable by the descent of the barrier for throwing said clutch into engagement to permit transmission of power from the first to the second shaft, means operable by rotation of the second shaft to raise the lowered barrier, means operable when the lowered barrier has reached its uppermost position to disengage the clutch of the second shaft, means operable automatically for reversing the position of the elevated barrier and means operable automatically by rotation of the power shaft to reëngage the retaining means.

6. A fish stop including a pair of vertically movable barriers for submersion in a stream, one at a time, a slidably mounted rod, means on the rod for retaining the elevated barrier in position, a reduction gearing operable continuously by a power shaft, means operable by the flow of the stream for operating said power shaft, a clutch member slidably mounted on the power shaft, means retaining said clutch member out of engagement, a second clutch member loosely mounted on the shaft adapted to be engaged by the first clutch member out of engagement, a second clutch member loosely mounted on the shaft adapted to be engaged by the first clutch member, a weighted arm carried by the second clutch member, a third clutch member adapted to be normally engaged by the second clutch member, means operable intermittently by the reduction gearing for releasing the first clutch member, whereby all of said clutch members may be rotated, means operable by rotation of the third clutch member for shifting the slidably mounted rod whereby to release the elevated barrier, continued rotation of the second clutch member to dispose the weighted arm above the vertical center of the power shaft permitting further rotation of the second clutch member by the weight of the arm whereby to urge the first clutch member toward normal position, means for elevating the lowered barrier, means operable by descent of the first barrier for initiating operation of said elevating means, means operable when the lowered barrier is elevated to its uppermost position to discontinue operation of the elevating means thereof, and means for reversing the position of the elevated barrier.

7. A fish stop including a pair of vertically movable barriers for submersion in a stream, one at a time, a power shaft, means operable by the flow of the stream for operating said power shaft continuously, a reduction gearing operable continuously by the power shaft, means retaining the elevated barrier in position, means operable intermittently by the reduction gearing for releasing the elevated barrier, a pair of shafts, gearing loosely mounted on said shaft for operation by the power shaft, a clutch member on each of said second shafts, means operable by the descent of the released barrier for permitting engagement of the clutch on the shaft of the lowered barrier whereby to initiate operation thereof to elevate said lowered barrier, means operable when the barrier has ascended to its uppermost position to discontinue operation of its elevating shaft, and means for reversing the position of the elevated barrier.

8. A fish stop including a pair of vertically movable barriers, for submersion in a stream one at a time, means retaining the elevated barrier in position, means operable by the flow of the stream for intermittently releasing said retaining means, means operable by the descent of the barrier for elevating the other barrier, means pivotally mounting the barriers for rotation to reverse their faces from a position toward upstream to a position toward down-stream, or vice versa, a vertically movable weight carried by each barrier tending to reverse the same when the barrier is elevated, means operable by the descent of a barrier to elevate the weights, and automatic means for retaining the weight in elevated position.

In testimony whereof I affix my signature in presence of two witnesses.

ALBERT D. MARSTON.

Witnesses:
    ALMA YOUNG,
    C. D. LUECK.

Copies of this patent may be obtained for five cents each, by addressing the "Commissioner of Patents, Washington, D. C."